(12) United States Patent
Fiegl et al.

(10) Patent No.: US 10,864,658 B2
(45) Date of Patent: Dec. 15, 2020

(54) MOLD WITH INTEGRAL DRIVER BLOCKS

(71) Applicant: Rohr, Inc., Chula Vista, CA (US)

(72) Inventors: Michael Fiegl, San Diego, CA (US);
Craig Robinson, San Diego, CA (US);
Shawn Canela, Grand Terrace, CA (US)

(73) Assignee: Rohr, Inc., Chula Vista, CA (US)

( * ) Notice: Subject to any disclaimer, the term of this patent is extended or adjusted under 35 U.S.C. 154(b) by 226 days.

(21) Appl. No.: 15/042,972

(22) Filed: Feb. 12, 2016

(65) Prior Publication Data
US 2017/0232642 A1  Aug. 17, 2017

(51) Int. Cl.
| | | |
|---|---|---|
| *B29C 33/12* | (2006.01) | |
| *B29D 99/00* | (2010.01) | |
| *B29C 70/48* | (2006.01) | |
| *B64F 5/10* | (2017.01) | |
| *B64C 3/24* | (2006.01) | |
| *B64C 5/00* | (2006.01) | |
| *B29K 307/04* | (2006.01) | |
| *B29L 31/30* | (2006.01) | |
| *B64C 1/00* | (2006.01) | |
| *B64C 9/00* | (2006.01) | |

(52) U.S. Cl.
CPC .............. *B29C 33/12* (2013.01); *B29C 70/48* (2013.01); *B29D 99/0028* (2013.01); *B64F 5/10* (2017.01); *B29K 2307/04* (2013.01); *B29L 2031/3076* (2013.01); *B29L 2031/3085* (2013.01); *B64C 3/24* (2013.01); *B64C 5/00* (2013.01); *B64C 9/00* (2013.01); *B64C 2001/0072* (2013.01)

(58) Field of Classification Search
CPC .................................. B29C 33/12; B64C 3/24
See application file for complete search history.

(56) References Cited

U.S. PATENT DOCUMENTS

| | | | | |
|---|---|---|---|---|
| 1,596,862 A | * | 8/1926 | Aikens ................... | B21D 51/00 |
| | | | | 29/243.517 |
| 1,621,573 A | * | 3/1927 | Armour .................... | B21L 5/00 |
| | | | | 72/400 |
| 5,041,182 A | * | 8/1991 | Sekiguchi ............. | B29C 70/345 |
| | | | | 156/245 |
| 5,135,382 A | * | 8/1992 | Tsuchiya ................. | B29C 33/22 |
| | | | | 425/330 |

(Continued)

FOREIGN PATENT DOCUMENTS

DE      102004009744      9/2005

OTHER PUBLICATIONS

Cole, Cynthia. "Guide for low cost design and manufacturing of composite general aviation aircraft." National Institute for Aviation Research, Wichita State University. http://www.niar.wichita.edu/agate/Documents/Advanced%20Manufacturing/WP3 (2001): 1-031200. (Year: 2001).*

(Continued)

*Primary Examiner* — Leith S Shafi
*Assistant Examiner* — Nicholas R Krasnow
(74) *Attorney, Agent, or Firm* — Getz Balich LLC

(57) ABSTRACT

Aspects of the disclosure are directed to a toolset configured to fabricate a component of an aircraft, the toolset comprising: a mold base configured to seat at least one mandrel, a mold lid configured to be coupled to the mold base, and at least one driver block that is integral with the mold lid and projects from an interior surface of the mold lid.

20 Claims, 18 Drawing Sheets

(56) References Cited

U.S. PATENT DOCUMENTS

| | | | | |
|---|---|---|---|---|
| 5,178,885 | A | * | 1/1993 | Vallier ................ B29C 33/0038 249/160 |
| 6,743,504 | B1 | | 6/2004 | Allen et al. |
| 8,191,854 | B2 | * | 6/2012 | Otten ....................... B29C 33/38 249/134 |
| 9,144,944 | B1 | | 9/2015 | White |
| 9,868,235 | B2 | * | 1/2018 | Plante ..................... B29C 70/48 |
| 2002/0069962 | A1 | * | 6/2002 | Maxwell ............... B29C 70/086 156/286 |
| 2006/0186580 | A1 | * | 8/2006 | Otten ..................... B29C 33/38 264/405 |
| 2007/0182065 | A1 | * | 8/2007 | Adams ................. B29C 43/027 264/322 |
| 2009/0308559 | A1 | * | 12/2009 | Powell ..................... B22C 7/02 164/30 |
| 2013/0130583 | A1 | * | 5/2013 | Bjornhov ................ B29C 70/48 442/218 |
| 2015/0174717 | A1 | | 6/2015 | Hethcock et al. |
| 2016/0303444 | A1 | * | 10/2016 | Weiss .................... A63B 59/20 |

OTHER PUBLICATIONS https://us.misumi-ec.com/maker/misumi/mech/tech/locatingpinshowtheyareused/ (Year: 2014).*
https://www.osha.gov/dts/osta/otm/otm_iii/otm_iii_1.html (Year: 2002).*
Cripps—https://web.archive.org/web/20040405121323/http://www.netcomposites.com/education.asp?sequence=60 (Year: 2004).*

\* cited by examiner

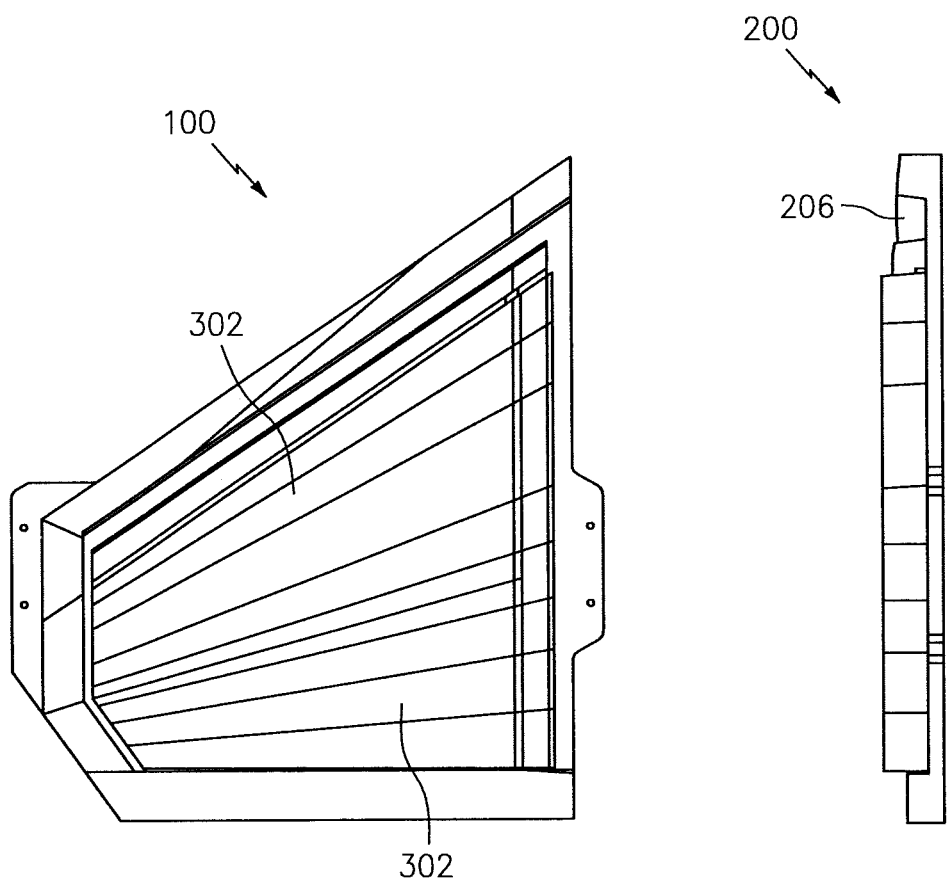
*FIG. 3A*    *FIG. 3B*

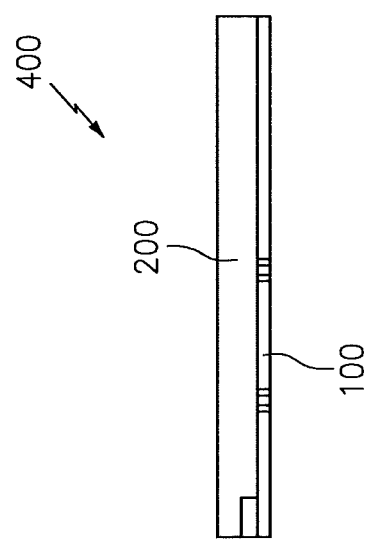
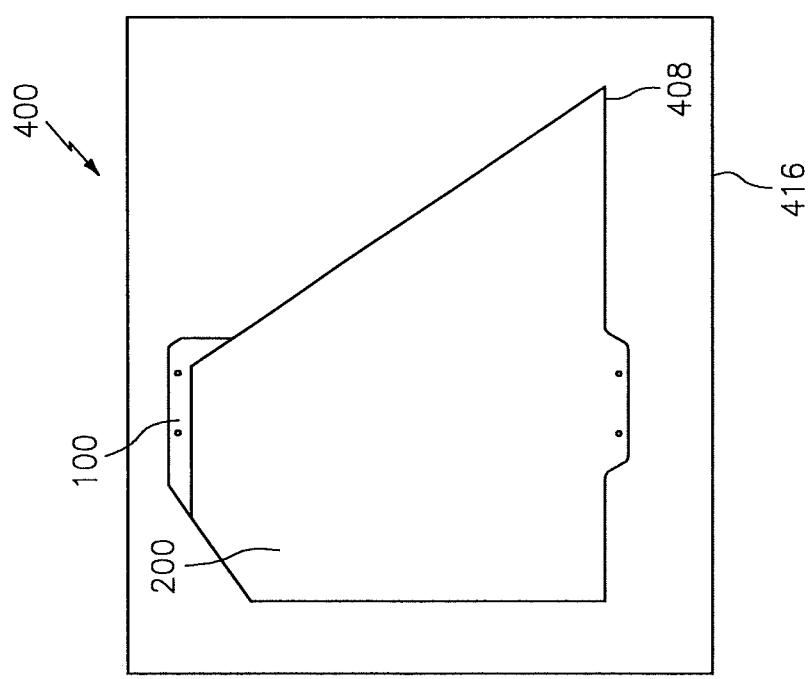
FIG. 4B
FIG. 4A

MOLD WITH INTEGRAL DRIVER BLOCKS

BACKGROUND

Various types of molding techniques may be used to construct components of an aircraft. For example, a resin pressure molding (RPM) technique or a Same Qualified Resin Transfer Molding (SQRTM) technique as developed by Radius Engineering, Inc., combines pre-preg processing and liquid molding to produce components targeted to aerospace applications. Reference may be had to FIG. 11, which illustrates a mold 1100 in accordance with the prior art. As part of these techniques, pre-preg plies are arranged within the mold 1100, the mold 1100 is closed, and then a resin is injected. The resin maintains hydrostatic pressure within the mold 1100.

As part of conventional fabrication/molding, a mandrel stack/assembly 1106 including a plurality of mandrels 1106*a* are inserted into a base 1112 of the mold 1100. Individual tapered tooling pieces 1118*a*, 1118*b*, 1118*c*, and 1118*d*, typically called "driver blocks", are the final pieces inserted into the mold assembly. Multiple driver blocks 1118*a*-1118*d* are individually pressed/driven into place, and typically require considerable force to locate properly. These driver blocks 1118*a*-1118*d* create lateral pressures in the mold 1100.

The driver blocks 1118*a*-1118*d* may be struck by a hammer or mallet, if necessary, in order to drive the mandrels 1106*a* into predetermined initial positions. Thereafter, a lid (not shown) is placed on top of the mold base 1112 and a press is activated. The press applies pressure to clamp together the lid and the base 1112, and thereby further drive a driver block 1118*a*-1118*d* into its final position where it pushes laterally against the mandrels 1106*a* to clamp them together. When the fabrication of the component is complete, the press is deactivated, the lid is removed, and then the driver blocks 1118*a*-1118*d* are removed at elevated temperatures, e.g., 350 degrees Fahrenheit (177 degrees Celsius). Removal of the driver blocks 1118*a*-1118*d* at the elevated temperatures represent a cost in terms of the steps a technician/operator must take to remove the driver blocks 1118*a*-1118*d* while still hot, and to avoid burning him/herself. The driver blocks 1118*a*-1118*d* are discrete parts that are inserted and removed separately from the mold 1100. In FIG. 11, the driver blocks 1118*a*-1118*d* are shown at the relative positions they would be located when placed/inserted in the mold 1100.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a toolset configured to fabricate a component of an aircraft, the toolset comprising: a mold base configured to seat at least one mandrel, a mold lid configured to be coupled to the mold base, and at least one driver block that is integral with the mold lid and projects from an interior surface of the mold lid. In some embodiments, the toolset comprises the at least one mandrel. In some embodiments, the mold base includes a hard stop configured to prevent the at least one mandrel from being inserted into the mold base in an amount greater than a threshold. In some embodiments, the hard stop is configured as an elevated portion of the mold base relative to a floor of the mold base. In some embodiments, the at least one driver block is configured to locate the at least one mandrel in the mold base in terms of at least two reference directions. In some embodiments, the mold base includes a guide configured to couple the mold base and the mold lid. In some embodiments, the at least one driver block includes a plurality of driver blocks. In some embodiments, the toolset is configured to fabricate at least one of a control structure, an airfoil, or a wing of the aircraft. In some embodiments, the toolset is configured to fabricate at least a portion of a stabilizer or stabilator of the aircraft. In some embodiments, the component includes a first skin formed by the mold lid and a second skin formed by the mold base. In some embodiments, the component includes a spar formed by the at least one mandrel. In some embodiments, the at least one driver block includes a double angle and the at least one mandrel includes a matching angle to prevent a mold lock condition. In some embodiments, the at least one driver block is configured to force and hold a composite material to a predetermined dimension during a curing of the component.

Aspects of the disclosure are directed to a method for fabricating a component using a composite material, the method comprising: laying-up mandrels and skins in a mold base and a mold lid, assembling a mold by assembling the mandrels into the mold base and installing the mold lid onto the mold base, the assembled mold including at least one driver block that is integral with the mold lid and projects from an interior surface of the mold lid, closing the mold and placing the mold into a press, drawing a vacuum and injecting resin, curing the component at a curing temperature, removing the mold from the press, and removing the lid with the at least one integral driver block from the mold base, thereby automatically extracting the at least one driver block from the mold base as the lid is raised. In some embodiments, the lid is removed when the at least one driver block is at a temperature that is close to the curing temperature. In some embodiments, the composite material includes a carbon pre-preg material. In some embodiments, the component includes at least a portion of a stabilizer or stabilator of an aircraft.

BRIEF DESCRIPTION OF THE DRAWINGS

The present disclosure is illustrated by way of example and not limited in the accompanying figures in which like reference numerals indicate similar elements.

FIG. 3A represents an additional view of the mold base of FIG. 1A.

FIG. 3B represents an additional view of the mold lid of FIG. 2A.

FIGS. 4A-4D illustrate an assembled mold in accordance with aspects of this disclosure.

DETAILED DESCRIPTION

Figure 1A:
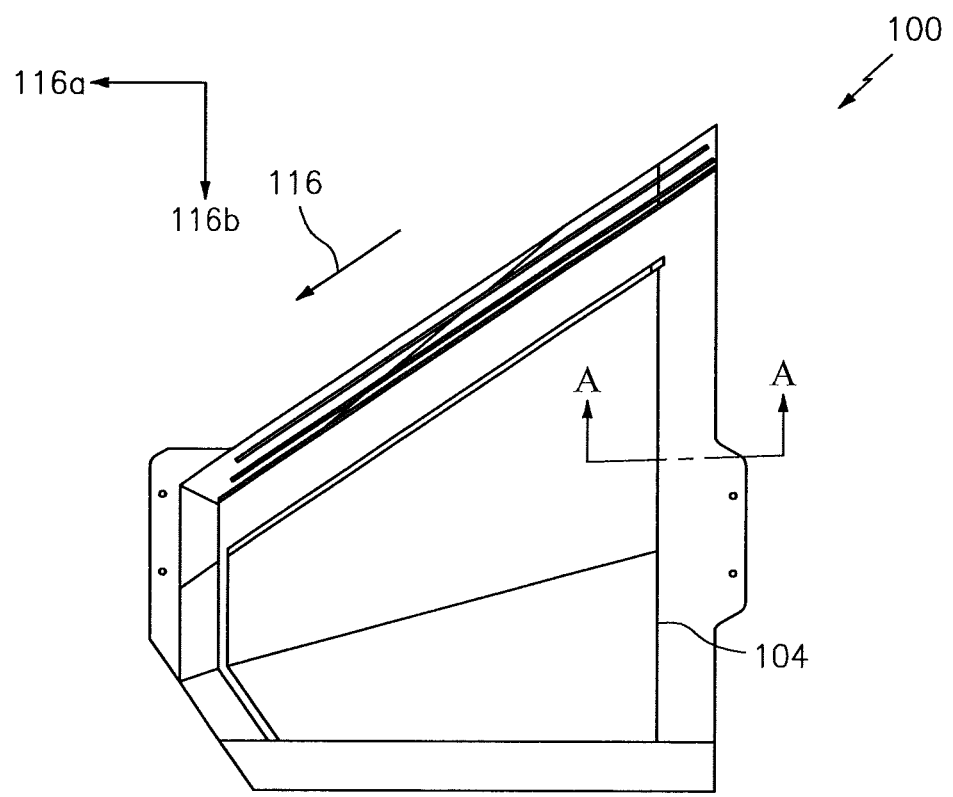
FIG. 1A illustrates a top view of a mold base in accordance with aspects of this disclosure.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems, and methods are described in connection with a toolset used to produce a component of, e.g., an aircraft. In some embodiments, the toolset may include a mold. The mold may be composed of two or more portions or sections, such as for example a base and a lid. One or more driver blocks may be integral with (e.g., machined as part of or assembled to) the lid.

Figure 1B:
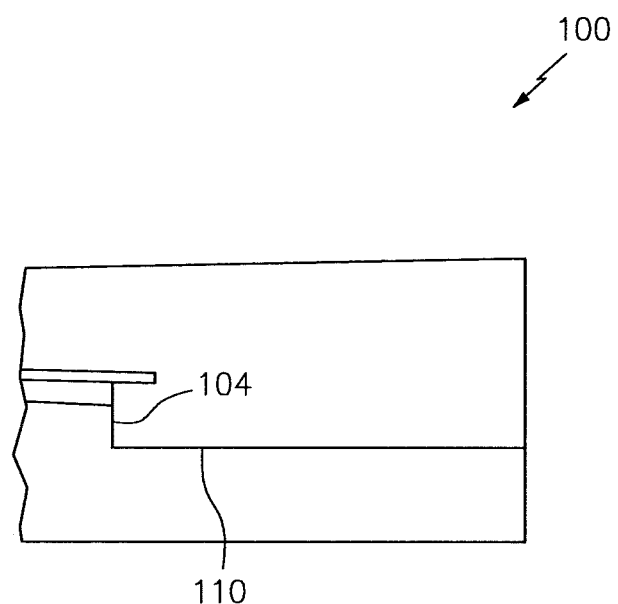
FIG. 1B illustrates a perspective view of a portion of the mold base of FIG. 1A about the line A-A of FIG. 1A.

Referring now to FIGS. 1A-1B, a mold base 100 associated with a toolset (e.g., toolset 700 of FIG. 7A) is shown. The mold base 100 may include a hard stop 104. The hard stop 104 may be implemented/configured as an elevated portion of the mold base 100, relative to a base/floor 110 of the mold base 100. The hard stop 104 may prevent mandrels (see, e.g., mandrels 302 of FIG. 3A) from being inserted/installed too far (e.g., in an amount greater than a threshold) into the mold base 100 in the direction of arrow 116. More generally, the hard stop 104 may locate the mandrels in a proper/predetermined position.

Figure 2A:
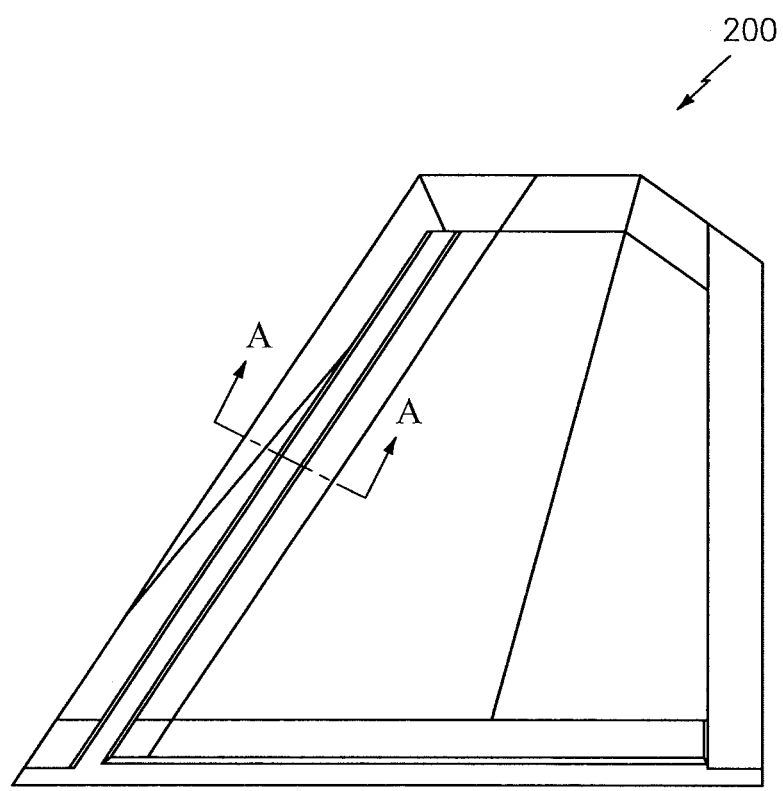
FIG. 2A illustrates a top view of a mold lid in accordance with aspects of this disclosure.
Figure 2B:
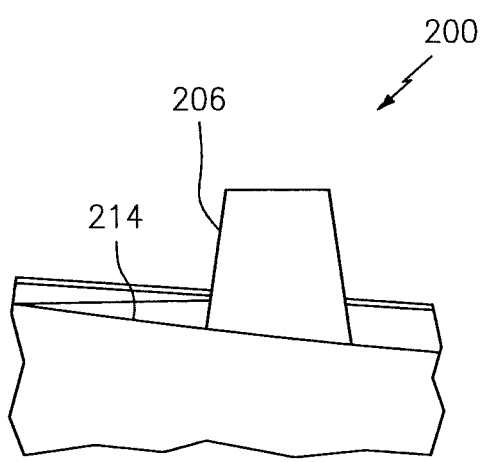
FIG. 2B illustrates a side view of a portion of the mold lid of FIG. 2A about the line A-A of FIG. 2A.

Referring to FIGS. 2A-2B, a mold lid 200 associated with the toolset is shown. The mold lid 200 may include locating/guide features that may provide a technician/operator with direction in terms of coupling/placing the mold lid 200 on top of the mold base 100.

The mold lid 200 may include one or more driver blocks/features, such as for example a driver block 206. In some embodiments, the driver blocks may project from an interior surface 214 of the mold lid 200. In some embodiments, the driver blocks may be integrally formed with the lid by machining from a single billet of material. The use of a single piece may help avoid introducing crevices where material may inadvertently be located/trapped. Alternatively, the integral driver blocks might be separately formed and mechanically attached, bolted, or welded to the lid. Such separation may facilitate a partial replacement procedure in the event that one or more portions of the mold lid (e.g., a driver block) need to be replaced due to wear, for example.

The driver blocks 206 may be used for ensuring that the mandrels are properly seated/located within the mold base 100 in one or more reference directions (e.g., reference directions 116a and 116b—see FIG. 1A). For example, a driver block 206 is driven in one direction by the press into the mold and the cam angles cause it to push against the mandrels in an orthogonal direction. Pushing the mandrels together helps apply pressure to, e.g., pre-preg located between the mandrels that may form ribs of a component (e.g., a stabilizer or stabilator). A size/dimension of the driver blocks 206 may be selected/predetermined to provide for any of the functionality described above or herein. In reference to FIG. 4D, lateral pressure is applied without a locking condition or part hang-up occurring as described further below.

Referring to FIGS. 3A-3B, the mold base 100 and the mold lid 200 are shown in a disassembled state with respect to on another. In FIG. 3A the mold base 100 is shown with mandrels 302 having been inserted/installed. The driver block 206 incorporated in the mold lid 200 may be used to locate/position the mandrels 302 in the mold base 100 within a given tolerance/threshold.

Figure 4C:
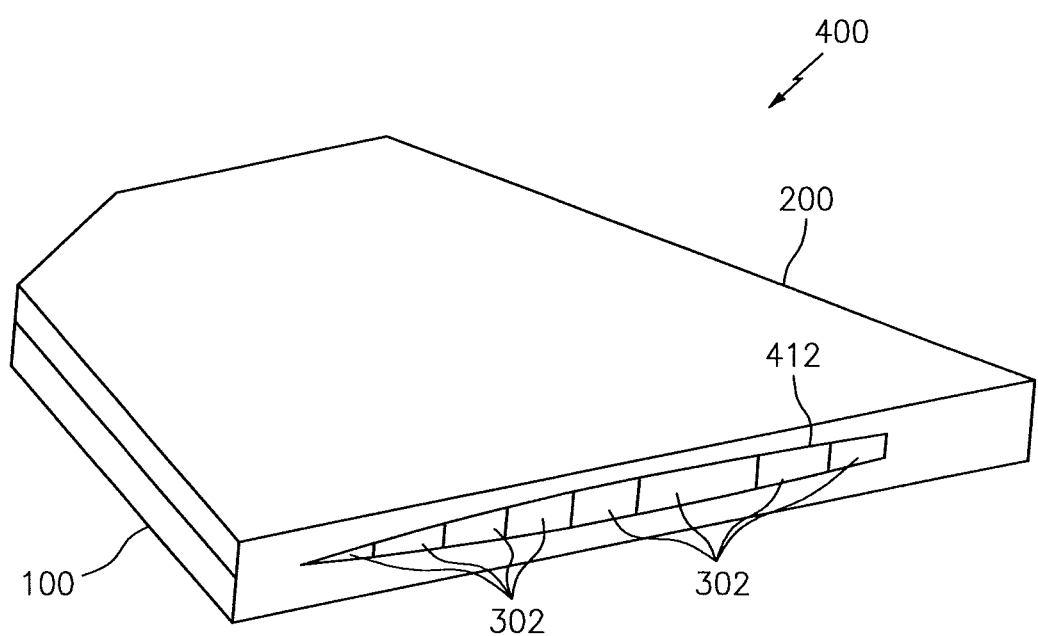

Referring to FIGS. 4A-4D, the mold base 100 and the mold lid 200 are shown in an assembled state to form an assembled/complete mold 400, where the mold lid 200 is placed on top of the mold base 100. The particular shape/form-factor shown is illustrative; modifications may be made. For example, while the mold 400 is shown as including a sharp corner 408, the corner 408 may be clipped or rounded to ensure operator/technician safety. An outline of composite material that may be used to fabricate a component is shown in FIG. 4C via reference character 412.

Figure 4D:
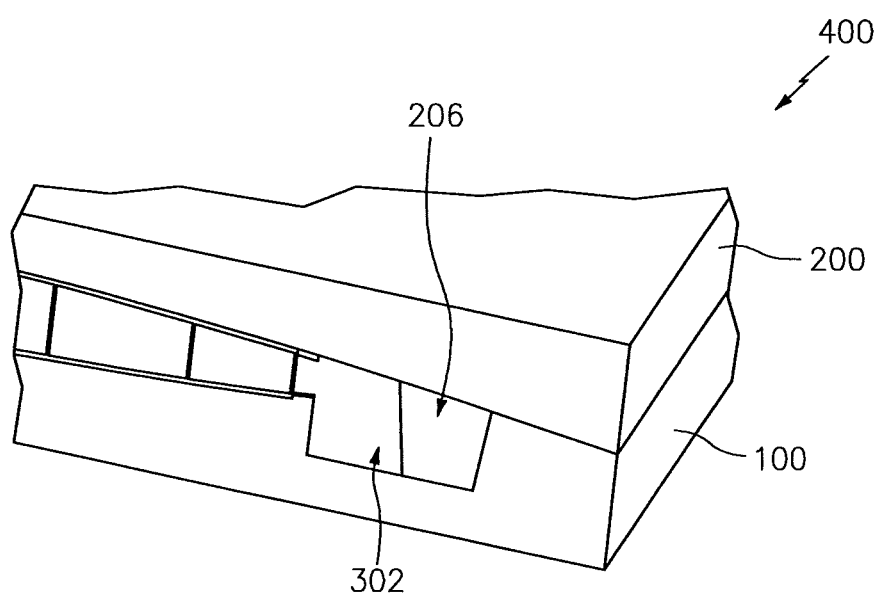

In some embodiments, one or more portions of the mold 400 may be configured with particular angles or dimensions to prevent mold lock. For example, and as seen in FIG. 4D, the driver blocks 206 may include a double angle to prevent a lock condition; a matching angle may be included on one or more of the mandrels 302. A further description of the angles associated with, e.g., the driver blocks 206 is provided below.

In some embodiments, an integral guide (see FIG. 9B) may be included to prevent the mold lid 200 from being driven back/away from the mandrels 302 during a closing of the mold 400.

The mold 400 (e.g., the base 100, the lid 200, and/or the mandrels 302) may be manufactured of one or more materials. For example, the mold 400 may include aluminum, steel, Invar or nickel-alloy, etc. Aluminum may be preferred based on being a relatively light-weight material with a high degree of heat transfer capability.

Figure 5:
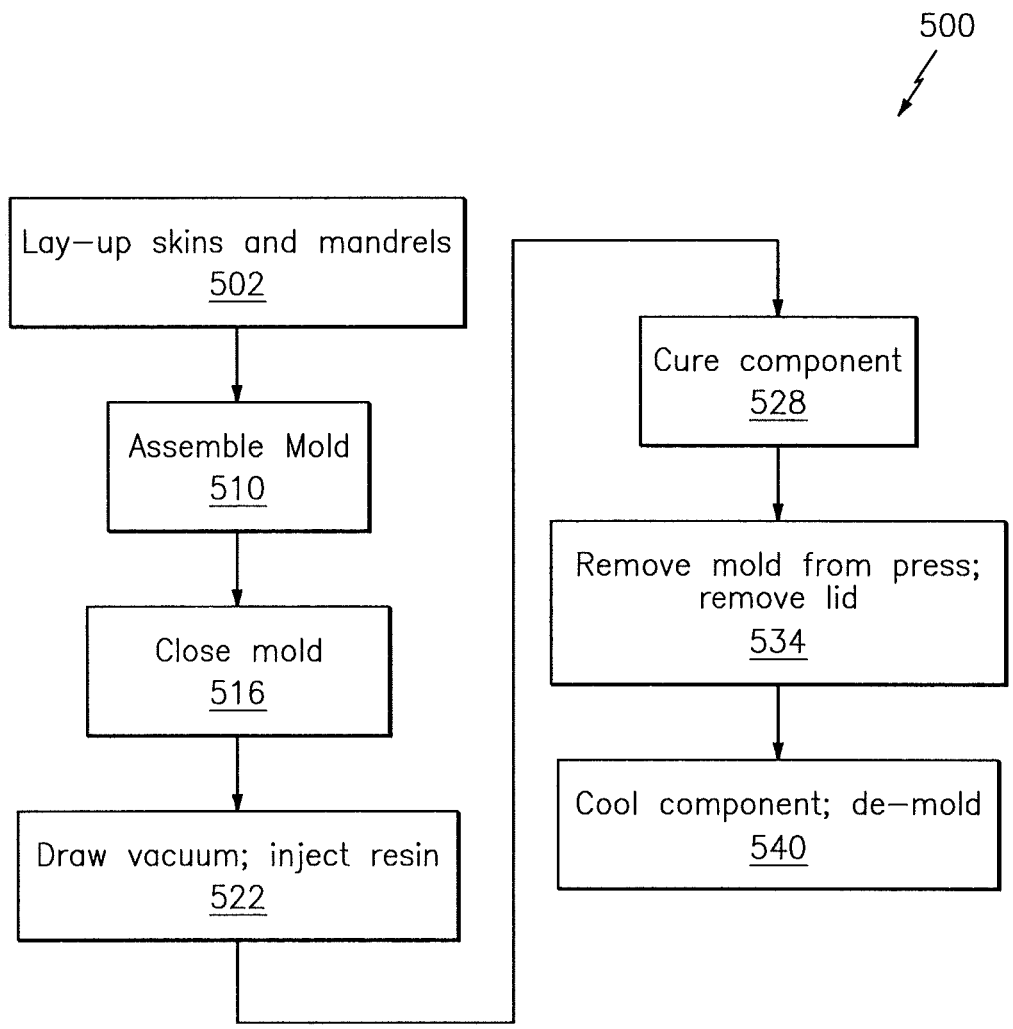
FIG. 5 illustrates a method for fabricating a component using the toolset described herein.

FIG. 5 illustrates a method 500 that may be used to fabricate a component using the toolset described herein.

In block 502, a lay-up of skins and mandrels may be provided. For example, a skin may be laid-up in a mold base and a skin may be laid-up in a mold lid. One or more mandrels may be laid-up as part of block 502.

In block 510, a mold may be assembled. For example, the mandrels of block 502 may be assembled into the mold base and the mold lid may be installed onto the mold base (and mandrels).

In block 516, the mold of block 510 may be closed. As part of block 516, the mold may be placed in a press (e.g., press 416—see FIG. 4A). The mold may be heated to at least an initial temperature. Such heating may apply via a platen in the press, or the mold itself may include an integrated heating source.

In block 522, a vacuum may be drawn. Resin may be injected at an intermediate temperature, where the intermediate temperature is above the initial temperature described above in connection with block 516. The resin may be injected to create/ensure a constant hydrostatic pressure (typically 75-100 psi) is maintained throughout an injection and cure cycle. During the heat-up phase, as the mold increases in size, there is a tendency for the pressure inside the mold to drop, possibly creating voids in the material. As the resin cures, it increases in volume, and there is a tendency for the pressure in the mold to become higher than optimum, if some of the resin cannot be pushed back out of the mold. The injection resin maintains pressure at the desired level throughout.

In block 528, the temperature may continue to increase (relative to block 522) until a threshold temperature is reached, referred to herein as a curing temperature. At this temperature the component may be formed via curing.

In block 534, the mold may be removed from the press and the mold lid may be removed. The lid may be removed when the driver blocks are still at an elevated temperature, such as for example close to the curing temperature of block 528. Such removal may be provided to avoid the mold material (e.g., aluminum) from shrinking to the point where removal of the component may become difficult.

In block 540, the component that is formed may be cooled and/or de-molded.

The method 500 is illustrative. In some embodiments, one or more of the blocks or operations (or portions thereof) may be optional. The blocks/operations may execute in an order or sequence that is different from what is shown. In some embodiments, additional blocks/operations not shown may be included.

In some embodiments, a component that is fabricated/formed via the toolset described herein may include a control structure, an airfoil, or a wing of an aircraft. In some embodiments, a component that is fabricated/formed via the toolset described herein may include at least a portion of a stabilizer or stabilator of an aircraft.

Figure 6:
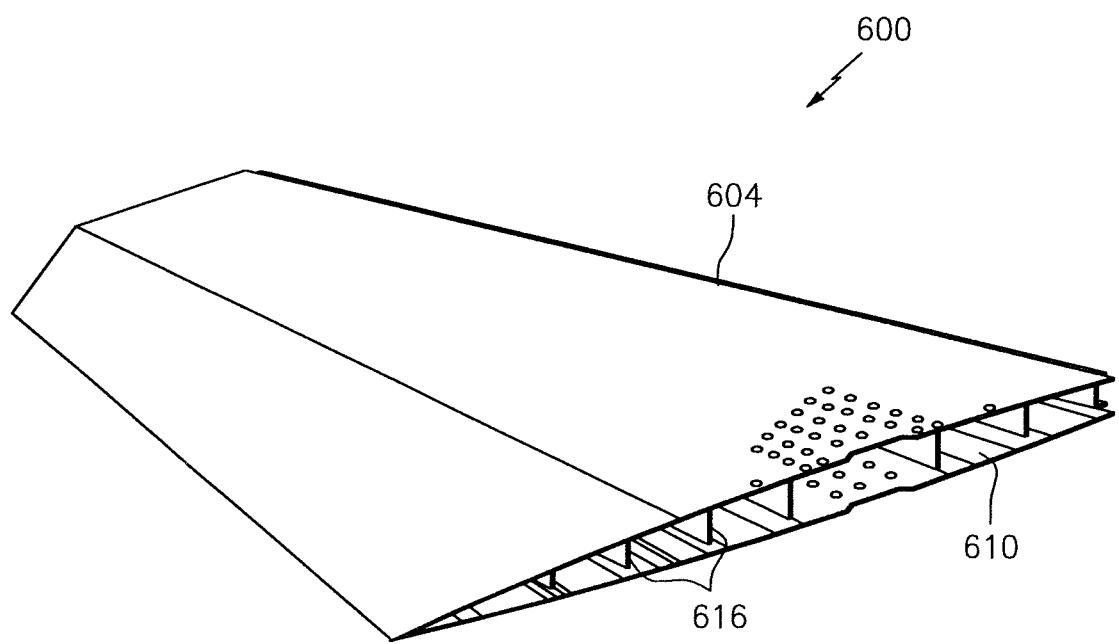
FIG. 6 illustrates a component formed via a toolset in accordance with aspects of this disclosure.

An example of a component 600 that may be fabricated/formed via the toolset described herein is shown in FIG. 6. In particular, the component 600 may include a first or upper skin 604 formed by the lid 200, a second or lower skin 610 formed by the base 100, and one or more spars 616 that may be formed by the mandrels 302.

Figure 7A:
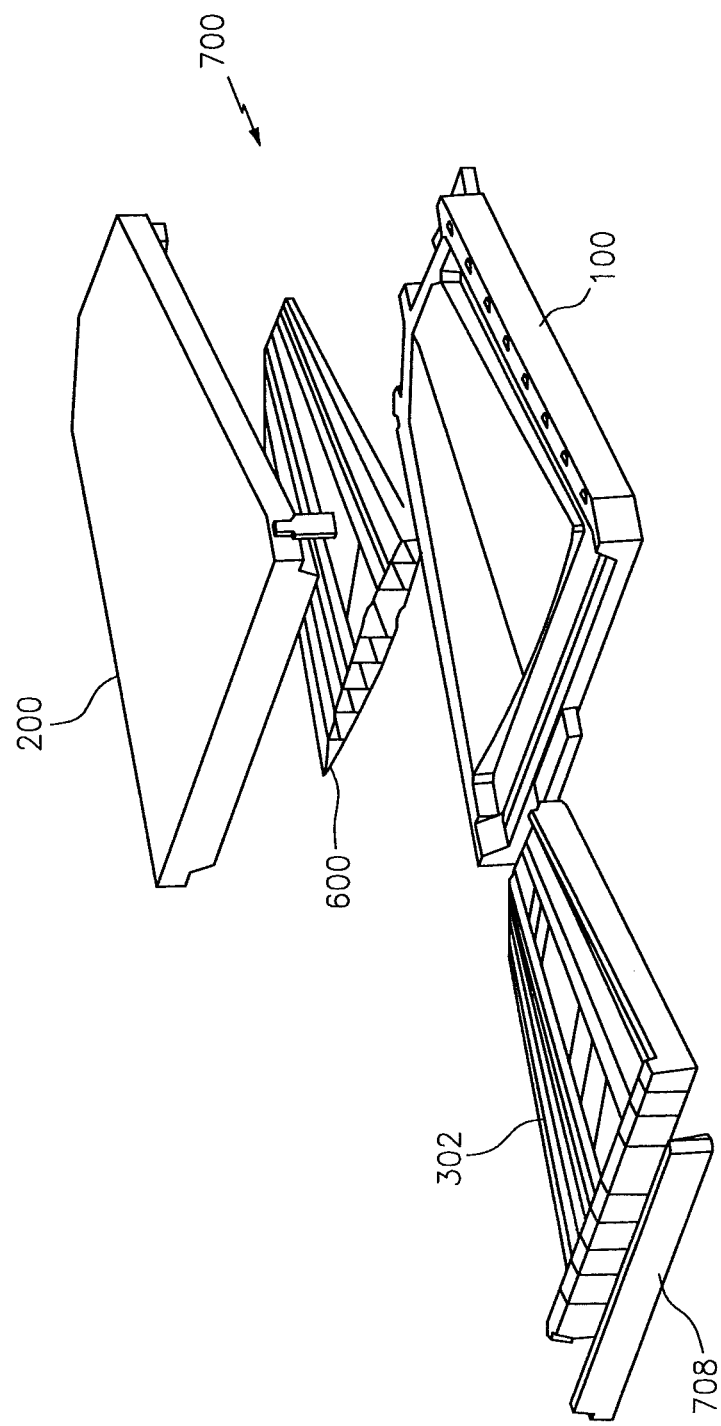
FIGS. 7A-7B illustrate a toolset for forming the component of FIG. 6 in accordance with aspects of this disclosure.

FIG. 7A illustrates, in an exploded/disassembled state, a toolset 700 that may be used to fabricate/form the component 600. In particular, the toolset 700 is shown as including the mold base 100, the mold lid 200, the mandrels 302, and a caul plate 708. As one skilled in the art would appreciate, the caul plate 708 may be used to protect one or more o-rings from incurring wear.

Figure 7B:
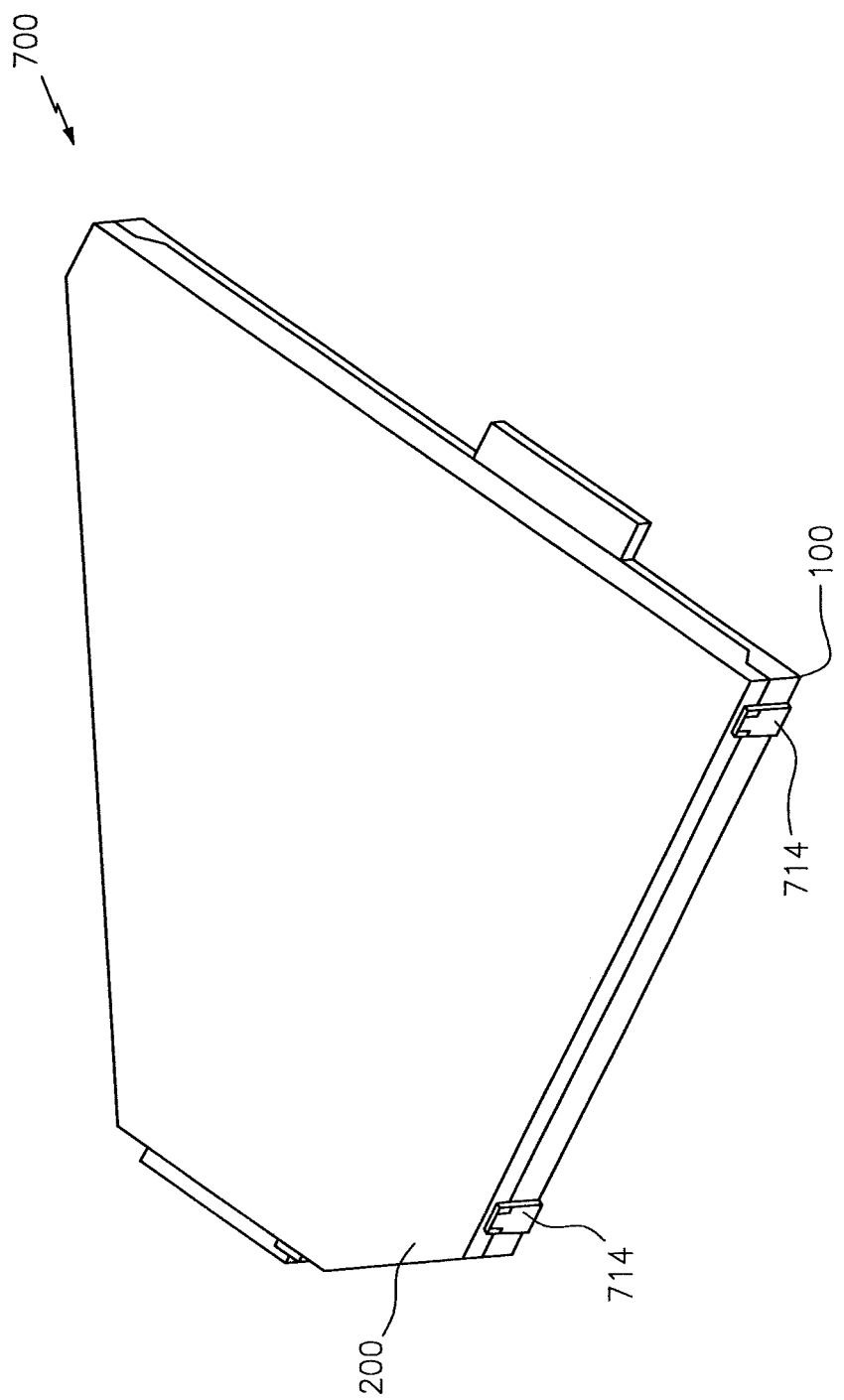
Figure 7C:
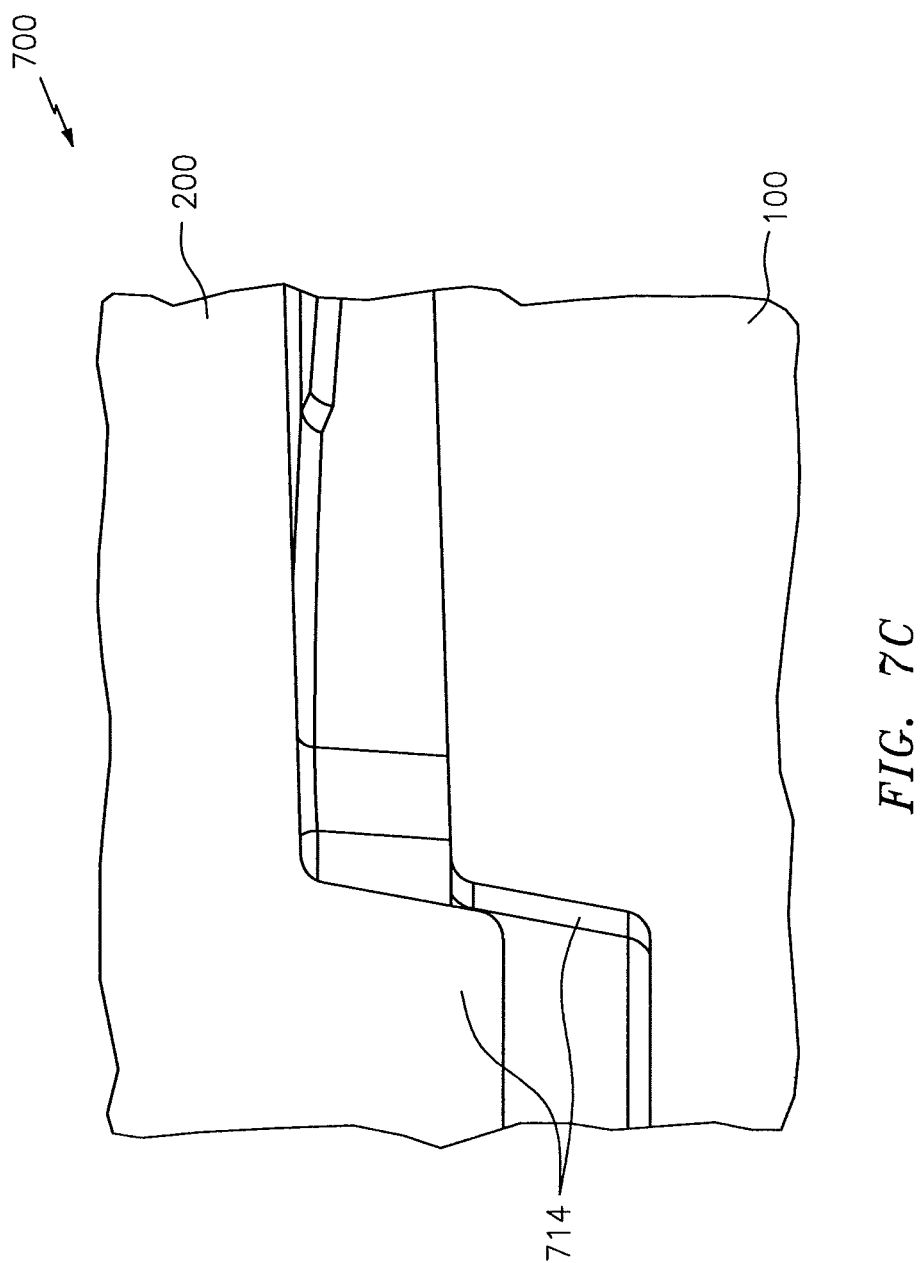
FIG. 7C illustrates in detail exemplary guides in the toolset of FIGS. 7A-7B.
Figure 8:
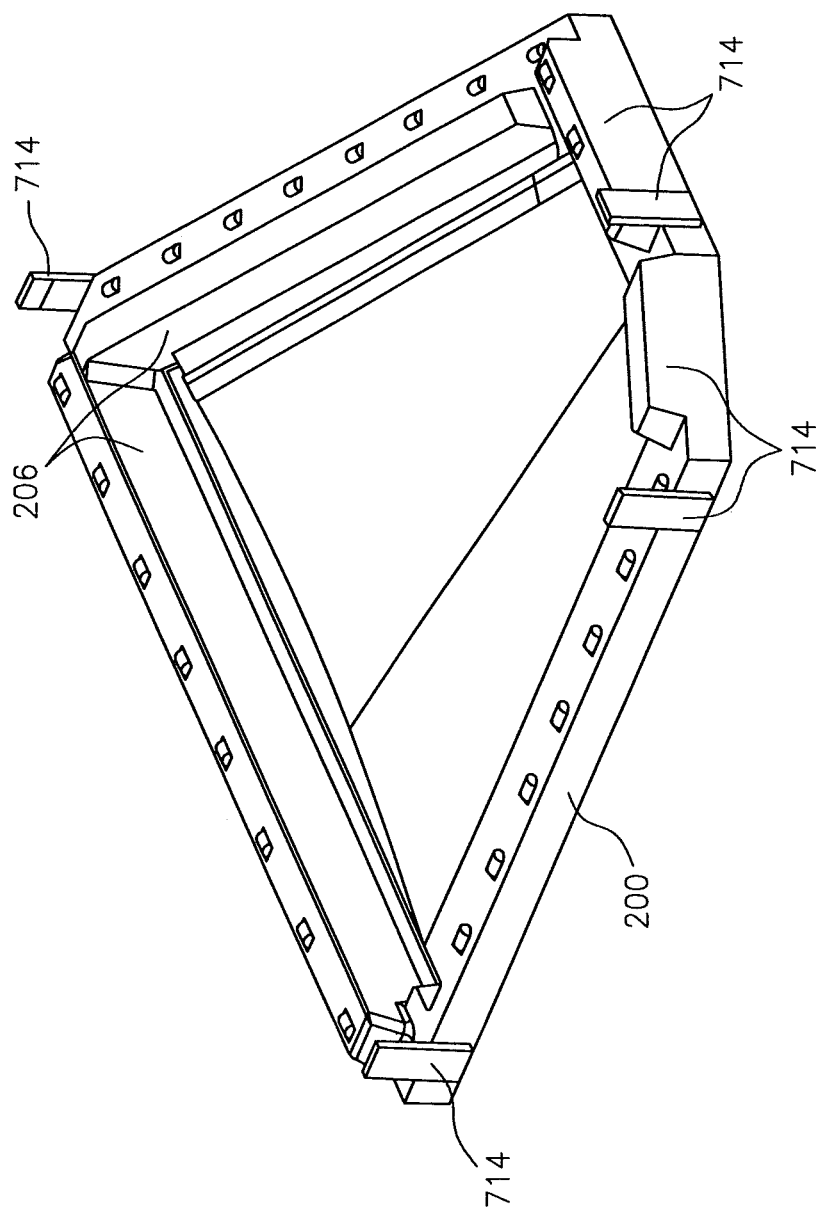
FIG. 8 illustrates a bottom view/surface of the mold lid of FIG. 2A with the guides of FIG. 7C at least partially incorporated in the mold lid.

FIG. 7B illustrates the toolset 700 in an assembled state. As shown in FIGS. 7B-7C the toolset 700 may include one or more guides or guiding devices/features 714. The guides 714 may be used to facilitate the assembly of the toolset 700 or the coupling of the mold base 100 and the mold lid 200. FIG. 8 provides another view of the mold lid 200 with the guides 714 at least partially incorporated therein.

There are a number of form factors that may be used, for the guides. For example, FIGS. 7C and 8 illustratively depict the guides 714 as being formed via tabs/flanges in the mold lid 200 and pockets/recesses in the mold base 100. In some embodiments, the guides may include one or more tracks that may couple to/mate with a roller/wheel for purposes of forming an assembled mold as described above. Alternatively, or additionally, the guides may include tooling pins, tapered pieces, etc.

In some embodiments, the guides may be configured to selectively engage or mate with one another in advance of the driver blocks 206 entering, or fully protruding into, a cavity formed in the assembled mold base 100 and mold lid 200.

Figure 9A:
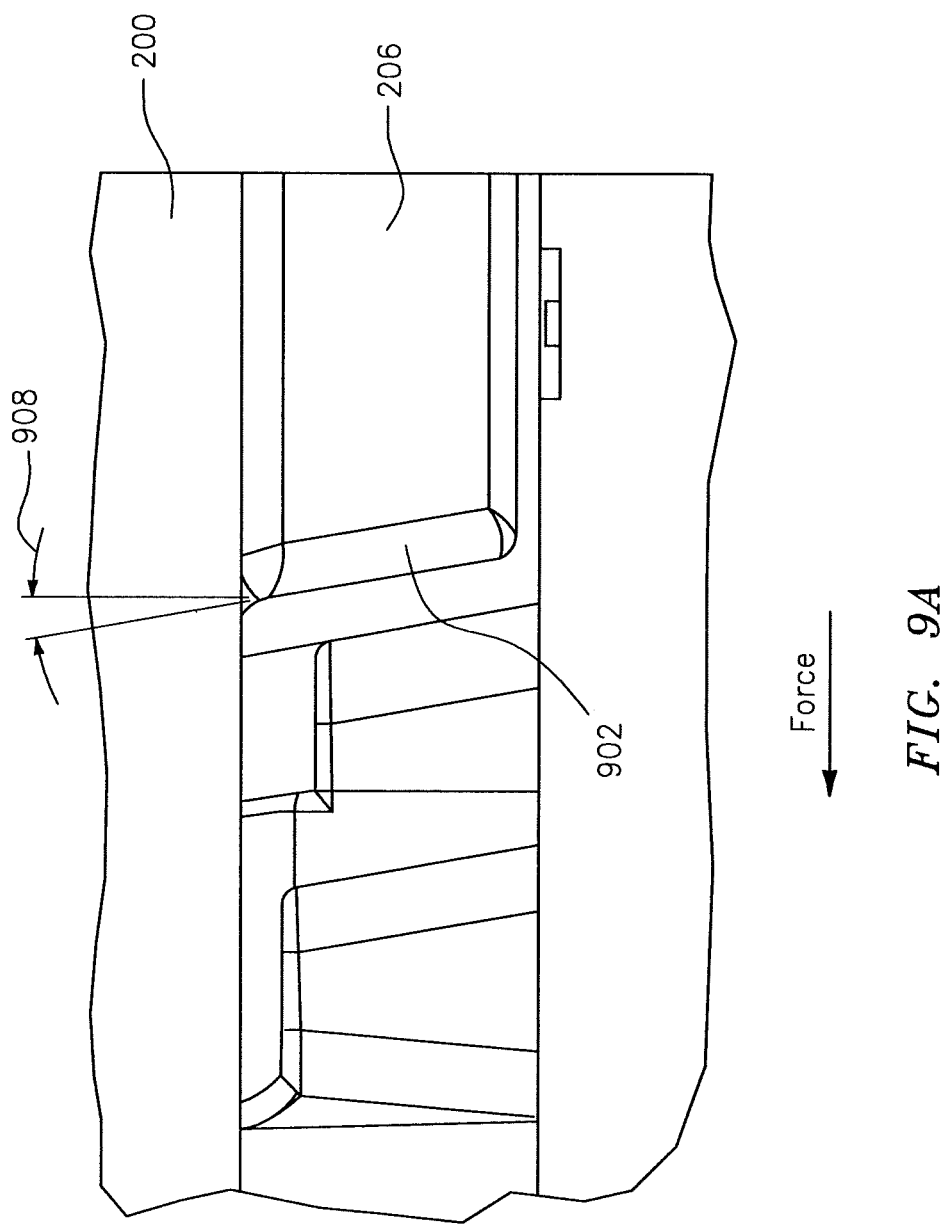
FIGS. 9A-9B illustrate angles associated with respective surfaces of a driver block in accordance with aspects of this disclosure.

As shown in FIG. 9A, a driver block 206 may include a first surface 902 that is oriented at an angle 908 relative to, e.g., a normal of the mold lid 200. The angle 908 may be at least seven degrees in some embodiments.

Figure 9B:
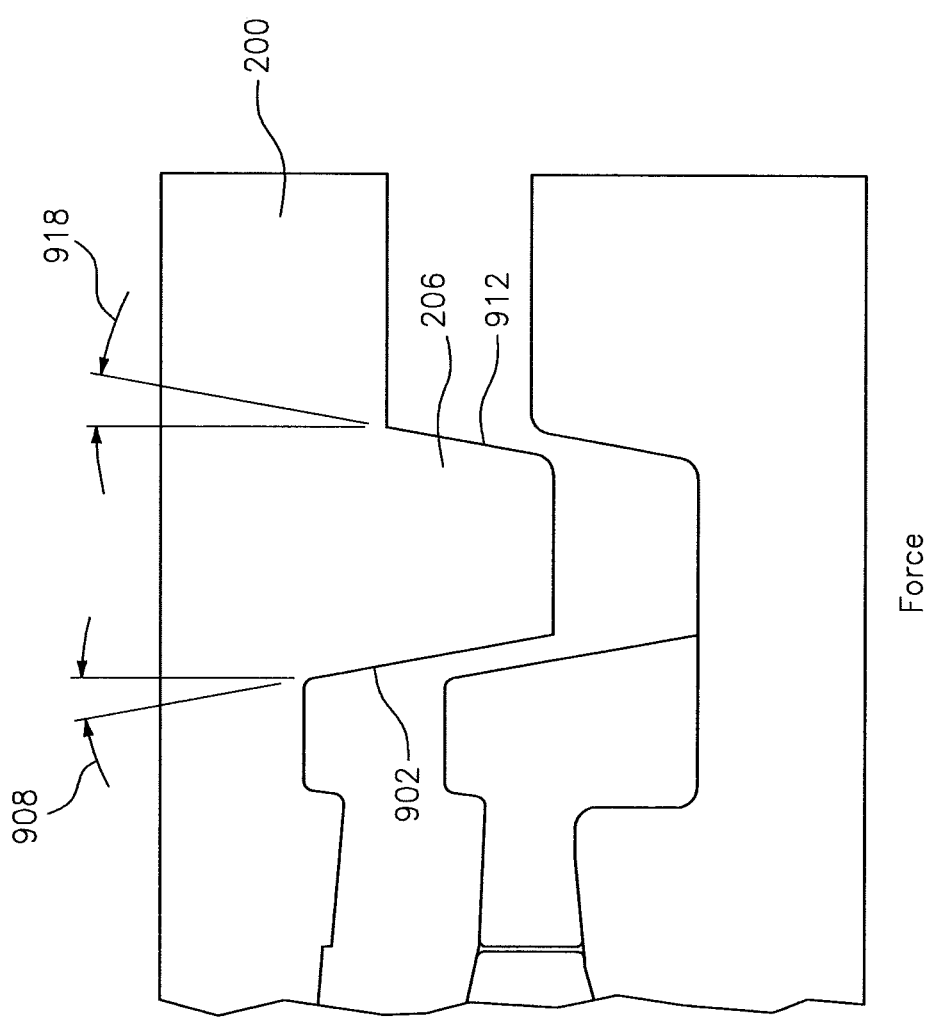

As shown in FIG. 9B, the driver block 206 may include a second surface 912 that is oriented at an angle 918 relative to the normal of the mold lid 200. The angle 918 may be at least seven degrees in some embodiments. In some embodiments, a combination or summation of the angles 908 and 918 may be at least fourteen degrees. Other values for the angle 908, the angle 918, or the combination of the angles 908 and 918 may be used. For example, in some embodiments the angle 908 and/or the angle 918 may have a value within a range of: (1) five to ten degrees, (2) four to fifteen degrees, or (3) three to twenty degrees.

Figure 10:
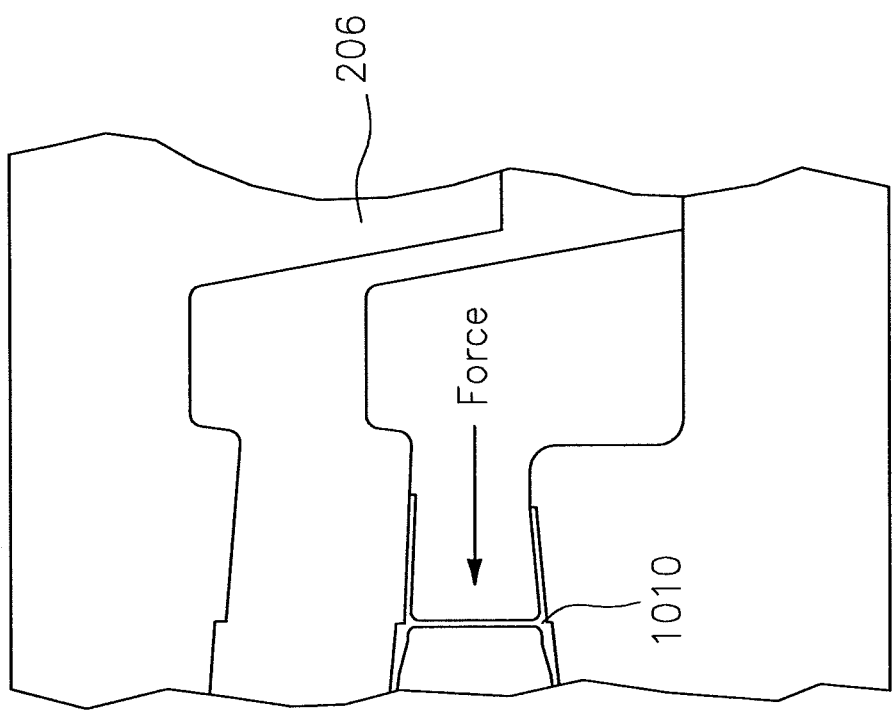
FIG. 10 illustrates a provisioning of a composite material in relation to a driver block in accordance with aspects of this disclosure.
Figure 11:
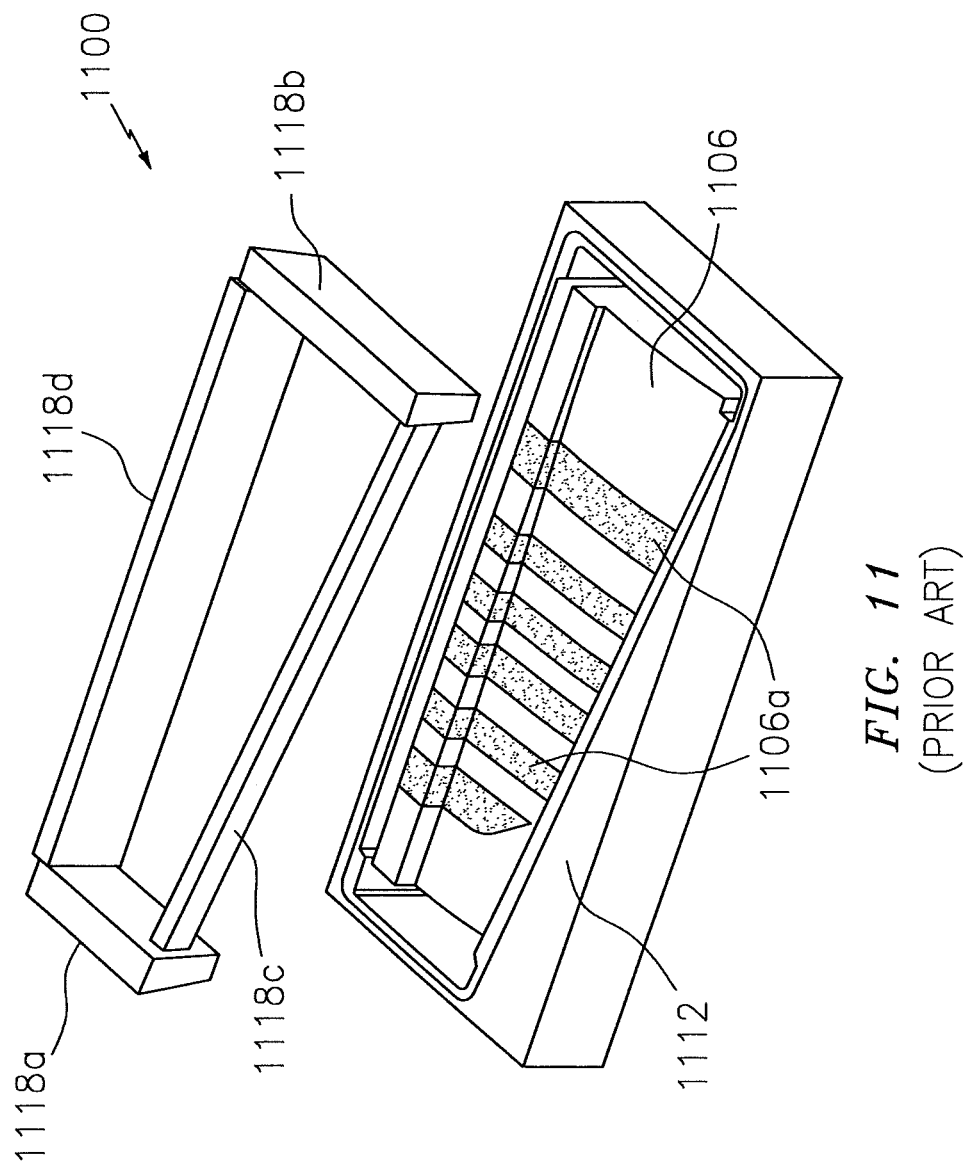
FIG. 11 illustrates a mold in accordance with the prior art.

FIG. 10 illustrates composite material 1010 in relation to a driver block 206. The driver block 206 forces and holds the composite material 1010 to a predetermined dimension (e.g., thickness) during curing. For example, the driver block 206 may force a compression of the composite material 1010 before and during a curing cycle. A press (e.g., press 416) may assist in holding and maintaining that compression.

Technical effects and benefits of the disclosure include an integration of driver blocks with a mold lid. Such integration may reduce procedural steps that need to be taken by an operator/technician as the operator might not need to engage in a separate step of installing or removing the driver blocks. Still further, the integration of the driver blocks with the lid may enhance safety as the operator might not need to separately handle the driver blocks; the driver blocks may be removed with the lid following the formation/fabrication of a component.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

We claim:

1. A method for fabricating a component using a composite material, the method comprising:

laying-up mandrels and skins in a mold base and a mold lid, wherein the mold base comprises a first mold base side surface, a second mold base side surface and a depression into the mold base formed laterally between the first mold base side surface and the second mold base side surface;

assembling a mold by assembling the mandrels into the mold base and installing the mold lid onto the mold base, the assembled mold including at least one driver block that is integral with the mold lid such that the at least one driver block and the mold lid are configured as a single unitary body, wherein the at least one driver block projects vertically away from an interior surface of the mold lid, wherein the at least one driver block has a width that decreases as the at least one driver block projects from the interior surface of the mold lid towards a distal end of the at least one driver block, wherein a portion of a first of the mandrels is seated in the depression such that the portion of the first of the mandrels is laterally abutted against the first mold base side surface, wherein the at least one driver block projects vertically into the depression such that the at least one driver block is laterally between and laterally contacts the portion of the first of the mandrels and the second mold base side surface;

closing the mold and placing the mold into a press;

drawing a vacuum and injecting resin;

curing the component at a curing temperature;

removing the mold from the press; and removing the lid, with the at least one integral driver block, from the mold base, thereby automatically extracting the at least one driver block from the mold base.

2. The method of claim 1, wherein the lid is removed when the at least one driver block is at an elevated temperature.

3. The method of claim 1, wherein the composite material includes a carbon pre-preg material.

4. The method of claim 1, wherein the component includes at least a portion of a stabilizer of an aircraft.

5. The method of claim 1, wherein the component comprises at least a portion of a stabilator or an aircraft.

6. The method of claim 1, wherein the mold base includes a hard stop configured to prevent the first of the mandrels from being inserted into the mold base in an amount greater than a threshold.

7. The method of claim 6, wherein the hard stop is configured as an elevated portion of the mold base relative to a floor of the mold base.

8. The method of claim 1, wherein the at least one driver block is configured to locate at least one of the mandrels in the mold base in terms of at least two reference directions.

9. The method of claim 1, wherein the mold base includes a guide configured to couple the mold base and the mold lid.

10. The method of claim 1, wherein the at least one driver block includes a plurality of driver blocks.

11. The method of claim 1, wherein the component is configured as at least a portion of a control structure, an airfoil or a wing of an aircraft.

12. The method of claim 1, wherein the component comprises a first skin formed by the mold lid and a second skin formed by the mold base.

13. The method of claim 12, wherein the component comprises a spar formed by and between a pair of the mandrels.

14. The method of claim 1, wherein the at least one driver block includes a double angle and the first of the mandrels includes a matching angle to prevent a mold lock condition.

15. The method of claim 1, wherein the at least one driver block is configured to force and hold the composite material to a predetermined dimension during a curing of the component.

16. The method of claim 1, further comprising removing the mandrels from the component after the curing of the component.

17. A method for fabricating a component using a composite material, the method comprising:

laying-up mandrels and skins in a mold base and a mold lid, wherein the mold base comprises a first mold base side surface, a second mold base side surface and a depression into the mold base formed laterally between the first mold base side surface and the second mold base side surface;

assembling a mold by assembling the mandrels into the mold base and installing the mold lid onto the mold base, the assembled mold including a tapered driver block that is integral with the mold lid such that the tapered driver block and the mold lid are configured as a single unitary body, wherein a portion of a first of the mandrels is seated in the depression, wherein the tapered driver block projects vertically into the depression such that (a) the tapered driver block is positioned laterally between and laterally contacts the portion of the first of the mandrels and the second mold base side surface and (b) the tapered driver block is configured to push the portion of the first of the mandrels laterally against the first mold base side surface;

closing the mold and placing the mold into a press;

drawing a vacuum and injecting resin;

curing the component at a curing temperature;

removing the mold from the press; and removing the lid, with the tapered driver block, from the mold base, thereby automatically extracting the tapered driver block from the mold base.

18. The method of claim 17, wherein the tapered driver block is configured to push the mandrels laterally together in order to apply lateral pressure to material located laterally between the mandrels.

19. The method of claim 1, wherein the width decreases as the at least one driver block projects from the interior surface of the mold lid to the distal end of the at least one driver block.

20. The method of claim 1, wherein the at least one driver block is configured to push the mandrels laterally together in order to apply lateral pressure to material located laterally between the mandrels.

* * * * *